United States Patent
Arditti et al.

(10) Patent No.: US 7,003,499 B2
(45) Date of Patent: Feb. 21, 2006

(54) SERVICE ACTIVATION BY VIRTUAL PREPAID CARD

(75) Inventors: David Arditti, Clamart (FR); Gilles Macario-Rat, Vanves (FR); Dimitri Mouton, Paris (FR); Nicolas Bugault, Paris (FR)

(73) Assignee: France Telecom SA, Paris (FR)

( * ) Notice: Subject to any disclaimer, the term of this patent is extended or adjusted under 35 U.S.C. 154(b) by 529 days.

(21) Appl. No.: 10/182,182

(22) PCT Filed: Jan. 30, 2001

(86) PCT No.: PCT/FR01/00276

§ 371 (c)(1),
(2), (4) Date: Jul. 25, 2002

(87) PCT Pub. No.: WO01/59726

PCT Pub. Date: Aug. 16, 2001

(65) Prior Publication Data

US 2003/0014360 A1    Jan. 16, 2003

(30) Foreign Application Priority Data

Feb. 9, 2000   (FR) .................................. 00 01681

(51) Int. Cl.
G06F 17/60   (2006.01)
(52) U.S. Cl. ............................ 705/67; 705/65; 705/74; 705/75; 705/76; 705/78; 705/79; 713/200; 713/202; 713/182; 713/185; 713/155; 713/156; 713/158
(58) Field of Classification Search ........ 713/200–202, 713/182–186, 155, 156, 158; 705/64–79
See application file for complete search history.

(56) References Cited

U.S. PATENT DOCUMENTS

| 4,650,975 | A |  | 3/1987 | Kitchener |  |
|---|---|---|---|---|---|
| 5,696,908 | A |  | 12/1997 | Muehlberger et al. |  |
| 5,903,633 | A |  | 5/1999 | Lorsch |  |
| 5,991,413 | A |  | 11/1999 | Arditi et al. |  |
| 6,192,131 | B1 | * | 2/2001 | Geer et al. ................. | 380/283 |
| 2003/0200179 | A1 | * | 10/2003 | Kwan ......................... | 705/65 |

FOREIGN PATENT DOCUMENTS

WO    WO 99/33033    7/1999

OTHER PUBLICATIONS

Panurach, "Money in Electronic Commerce: Digital Cash, Electronic Fund Transfer, and Ecash", Jun. 1996, Communications of the ACM, vol. 39, No. 6, pp. 45-50.*

* cited by examiner

Primary Examiner—James P. Trammell
Assistant Examiner—Jalatee Worjloh
(74) Attorney, Agent, or Firm—Lowe, Hauptman & Berner, LLP

(57) ABSTRACT

In order to prevent the use of a virtual prepaid card illegitimately acquired and transmitting only one identification code, for example read after the card has been scratched, to a service provision server, a second code is delivered on paying for the card, and the two codes have to be authenticated so that the user-purchaser of the card can subsequently use the service concerned in the server still using only the first code.

16 Claims, 3 Drawing Sheets

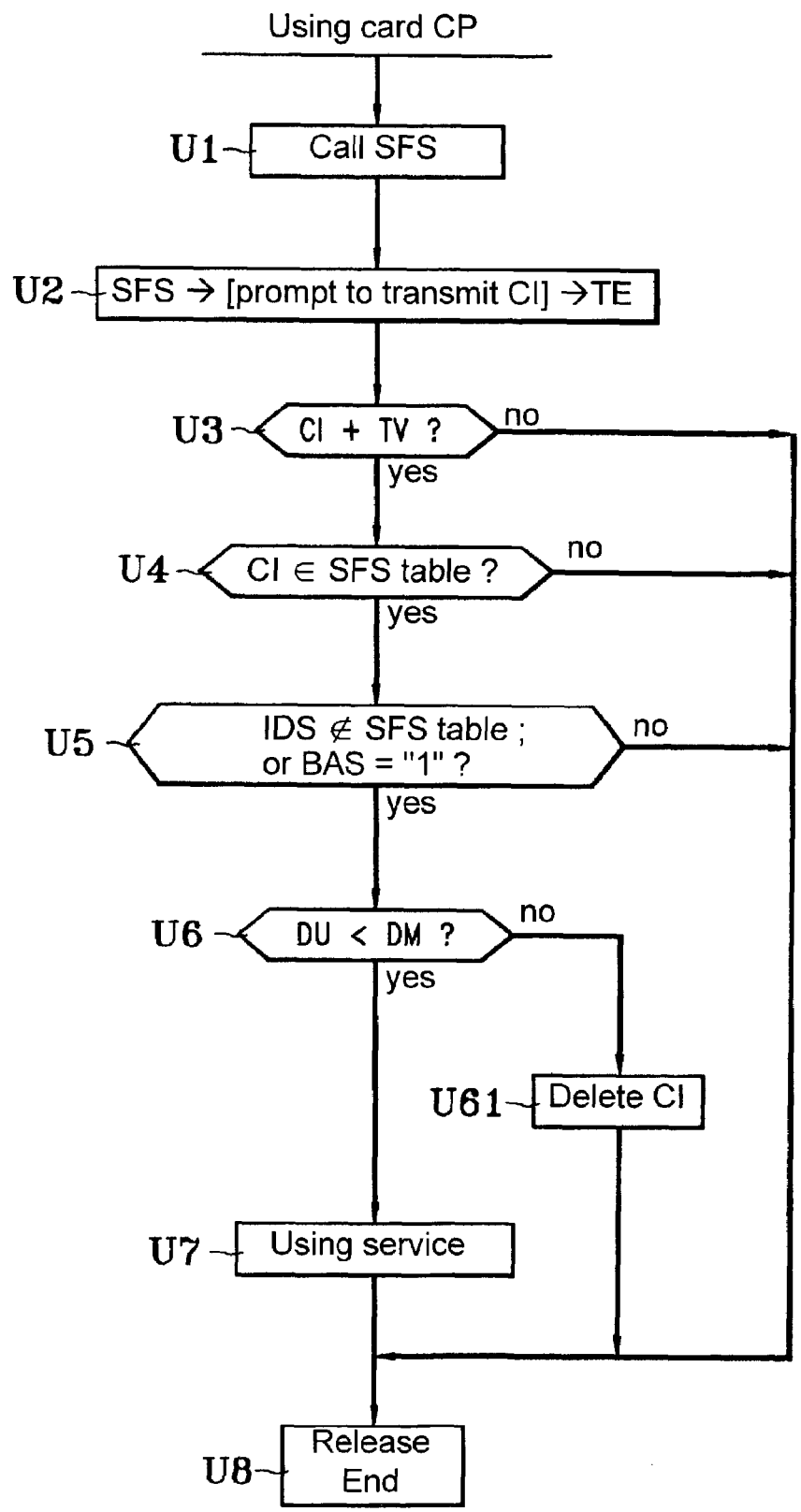

SERVICE ACTIVATION BY VIRTUAL PREPAID CARD

REFERENCE TO RELATED APPLICATION

This application is a 371 of the PCT International Application No. PCT/FR01/00276 filed on Jan. 30, 2001, which is based on the French Application No. 00-01681 filed on Feb. 9, 2000.

BACKGROUND OF THE INVENTION

1. Field of the Invention

The present invention relates to a method of activating virtual prepaid cards.

2. Description of the Prior Art

With reference to French patent FR 2750273, a prepaid card enables its holder to receive a service from a service provider, the payment for the service being made in advance when the card is purchased.

A distinction must be made between virtual prepaid cards and non-virtual prepaid cards. For a virtual prepaid card, all the characteristics of the card, and in particular its credit, are managed by a centralized server. For a non-virtual prepaid card, the card itself contains an integrated circuit with a microcontroller that contains all the characteristics of the card, including the remaining credit. The Télécarte (Registered Trade Mark) is one example of a non-virtual prepaid card.

The invention relates only to virtual prepaid cards, which are also known as "virtual tokens".

Unlike non-virtual prepaid cards, which necessarily include an electronic means in the form of the integrated circuit, virtual prepaid cards can be of two kinds:

non-material virtual prepaid cards, which consist of an identification code, generally a number, which can be read on a scratch card after scratching off a covering, for example, and material virtual prepaid cards, which consist of a physical device, for example a memory, in which the identification code has been prerecorded.

The following operations are effected before a virtual prepaid card can be used to access a service:

fabricating the card with an associated identification code,
storing the identification code in an authentication server,
selling the card,
authenticating the purchased card by the server,
providing a service, and
conducting a dialog with the server to enable the service provider to discover the remaining credit and the other parameters of the virtual prepaid card and to update the credit of the virtual prepaid card.

The user purchases a virtual prepaid card from a distributor-trader. During its fabrication, the card is initially credited with a number of units corresponding to its purchase price. Each unit enables to pay for a non-divisible portion of a service. As a general rule, it can be a monetary unit, a basic charge or a minute of call time, in the case of a telephone service, or any other portion of a service.

The virtual prepaid card is managed by the server, whose function is to update the remaining credit of the card, expressed as a number of units, and complementary data such as expiry dates, cancellation, etc.

To obtain a service from the service provider, the user must first prove that he is in possession of a virtual prepaid card. For this purpose the server authenticates the card.

The form of authentication described in U.S. Pat. No. 5,991,413 verifies the validity of a sequence of symbols sent to the server:

for non-material virtual prepaid cards, this sequence is the card identification code, which the user communicates to the server via a terminal means, and for material virtual prepaid cards, on each activation by the user, a different sequence of symbols constituting an identification code is computed cryptographically by the integrated circuit in the card; the integrated circuit can send it either to the server itself or only to the terminal means, which forwards it; this constitutes a secure authentication method.

If the authentication of the user's virtual prepaid card succeeds, the server indicates the credit remaining on the card to the service provider. This information can optionally be transmitted to the user.

The service provider can then, via the server, debit the user's account as a function of the service provided. The account can be debited before providing the service, or when the service is provided, or after the service has been provided, or by any combination of the above methods.

It is noticed that the service provider is not informed of the purchase of a virtual prepaid card. The service provider must therefore consider a virtual prepaid card to be usable throughout the period during which it is potentially on sale, i.e. in the stock of the service provider, then that of the distributor, and finally at the point-of-sale.

Neither the service provider prior to delivery to the distributor nor the distributor prior to the sale of the card is protected from theft of the virtual prepaid card, i.e. either from theft of the material support or simpler of the identification code in the case of a non-material virtual prepaid card; or from theft of the card in the case of a material virtual prepaid card.

The main drawback of state of the art is therefore that a stolen virtual prepaid card provides entitlement to the service on the same grounds as a virtual prepaid card acquired legitimately.

U.S. Pat. No. 5,903,633 proposes to prerecord a control code with a conventional Personal Identification Number (PIN) code in a telephone card having a magnetic stripe, the codes being partly visible on the card and partly obscured and readable only after scratching off a covering. Before the card retailer sells or otherwise transfers the card to the end user, a point-of-sale terminal transmits the control code to a centralized computer. To validate the purchase of the card and instruct the billing of the card to the retailer in an invoicing computer, the database in the centralized computer verifies the correspondence between the control code and the telephone number of the retailer's terminal. The user having the purchased card can then use the prepaid telephone card in a telephone set in the conventional way, after entering the PIN code.

Although the prior verification of the control code prevents fraudulent use of the PIN code, it requires each retailer to be provided with a terminal that can read the control code and transmit the control code to a specific centralized computer. Furthermore, anyone can find out the control code before purchasing a card, which is an incitement to fraud.

OBJECT OF THE INVENTION

The object of the invention is to circumvent the drawbacks described above in order to authorize access to the target service only to the user of a virtual prepaid card acquired legitimately and to bar such access to an ill-intentioned person who has obtained a knowledge of the identification code of the card, without using any kind of point-of-sale terminal.

SUMMARY OF THE INVENTION

To reach this object, a method of activating a service using a prepaid card in service provision means from user terminal means, a first code necessary to use the service being associated with the card and stored in the service provision means prior to payment for the card, is characterized in that it comprises the steps of:

delivering a second code associated with the card on paying for the card, authenticating one of the first and second codes, authenticating the other of the first and second codes when said one of the codes has been authenticated, and activating the service in the service provision means at least in response to the authenticated first code after said other of the codes has been authenticated.

The user terminal means can be an electronic terminal of the telephone and/or data terminal type, as explained hereinafter, or a man-machine interface between the user and a server, for example by using the postal service to transmit the two codes to the telephone service provider or by using an operator dedicated to validating cards.

The first code corresponds to the identification code used in the prior art technique, which is generally a number. The second code is added by the invention and can be known to anyone except the purchaser of the card at the time it is paid for, which prevents anyone who has stolen cards from the distributor finding out the code.

Just like the first code, the second code must be authenticated to certify validation of the card before it is used for the first time. However, the second code is not necessary for using the card, and is even deleted from the authentication means, such as servers, authenticating the card as soon as the use of the card is authorized, which does not change the usual habits of virtual prepaid card users.

The invention therefore has the advantages that illicit use of the card is prevented from the moment it is created until its first use by the legitimate purchaser and that validation of the card before the first use is secure for the service provider, the card distributor, and the user.

Preferably, each step of authenticating one code can comprise the steps of:

transmitting the code from the terminal means to authentication means having a prestored list of codes, searching for the code transmitted in the authentication means, and deleting the prestored code in response to the transmitted code and found in the authentication means, and continuing the method.

It is preferable if the step of authenticating the second code precedes the step of authenticating the first code, which can be executed only if the second code has been authenticated.

In a preferred embodiment of the invention, the steps of authenticating the first and second codes are respectively executed in first and second servers communicating with the terminal means via a server providing at least voice message. The second server transmits a service identifier, which is preferably all or part of the second code, to the service provision means, where the parts of the second code can be the value of the card and/or a card purchase receipt number and an identifier of the service and/or the service provider and/or the card issuer. The service is activated if the authenticated first code transmitted by the first server to the service provision means is found in correspondence with the service identifier in a prestored table of the service provision means.

The service provision means can be designated by an address in correspondence with the first and second codes authenticated in the first and second servers in order to transmit the authenticated first code and the service identifier therefrom to the service provision means.

According another feature of the invention, the service is deemed to be activated when the service provision means deletes a service identifier, which is preferably all or part of the authenticated second code, or changes the state of a service activation indicator, in a prestored table of the service provision means, after the authenticated first code is found in correspondence with the service identifier or with the service activation indicator in a predetermined state.

When the card is used, the service provision means can authorize access to the activated service only in response to the first code sent by the terminal means and to verification of the absence of a service identifier, or to verification of a predetermined other state of the service activation indicator in correspondence with the first code in the table.

BRIEF DESCRIPTION OF THE DRAWINGS

Other features and advantages of the present invention will become more clearly apparent on reading the following description of plural preferred embodiments of the invention, with reference to the corresponding accompanying drawings, in which:

FIG. 3 is an activated service use algorithm.

DETAILED DESCRIPTION OF THE PREFERRED EMBODIMENTS

Although the invention applies to diverse objects, whether they are actual services or products obtained indirectly via services, a preferred embodiment of the activation method of the invention is described hereinafter for activating a service offered by a telephone service provider and acquired by means of a prepaid card CP. The card CP is a "non-material" virtual prepaid card simply containing an identification code CI which is all that is necessary, to the exclusion of any other code, for each access to the service with respect to which it has been activated in accordance with the invention, the card including no integrated circuit and being referred to hereinafter as a "prepaid card". The code CI is readable on the card after scratching off a predetermined area. The service consists in making freely available to a user, who is purchaser and holder of the card CP, a telephone answering and recording equipment dedicated to a fixed telephone line selected by the user-purchaser and which can be interrogated remotely from any telephone set, including any mobile radiotelephone, during a maximum duration DM of a few months for a fixed charge F prepaid on purchasing the card.

Figure 1:
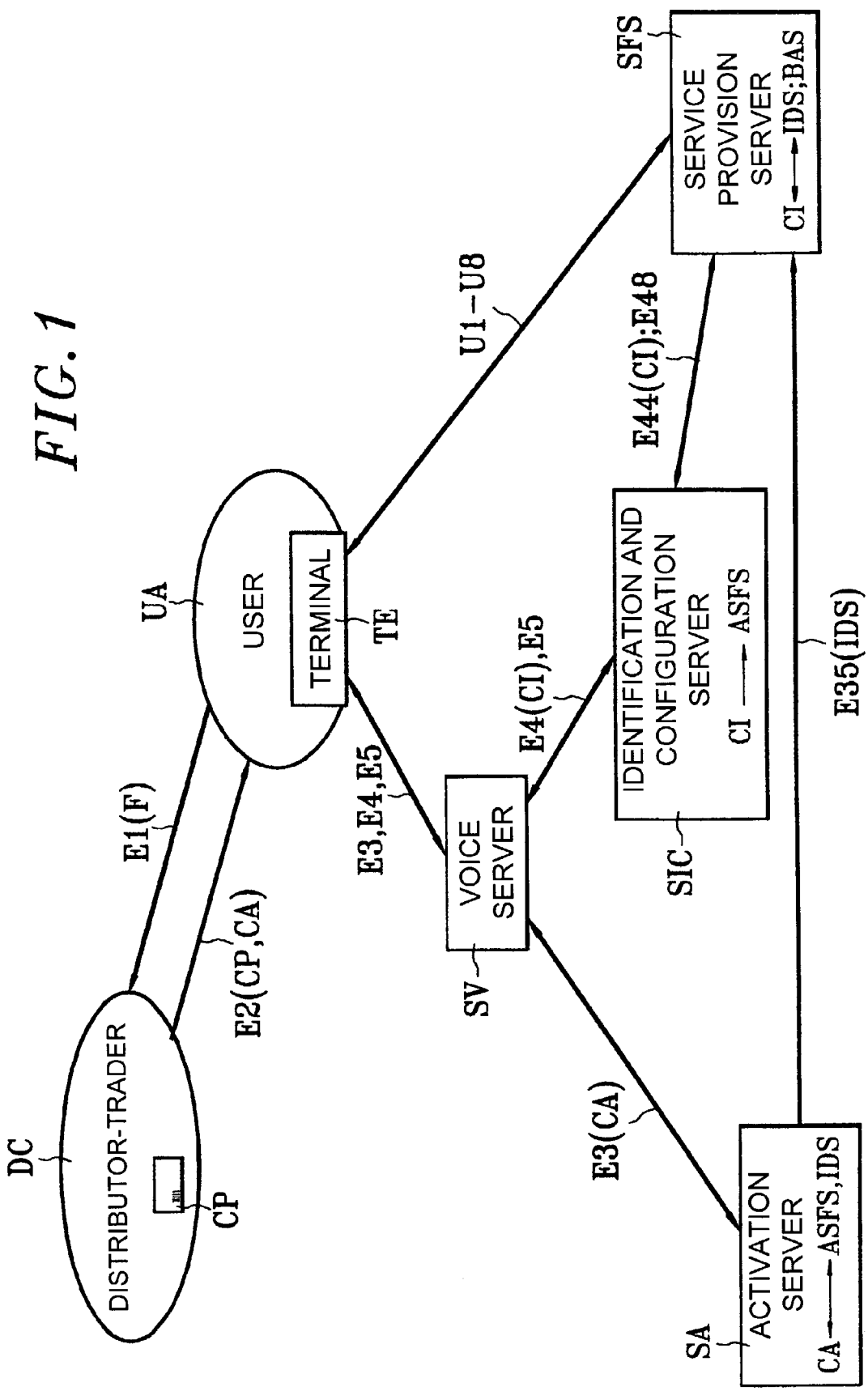
FIG. 1 is a schematic functional block diagram of a communication system for implementing a service activation method according to a preferred embodiment of the invention.

Referring to FIG. 1, a system for activating the target service and implementing the method according to the invention includes in addition to a service user-purchaser UA and a distributor-trader DC offering prepaid cards CP for sale, a voice server SV connected to an activation server SA and to an identification and configuration server SIC, and a service provision server SFS. All these servers are accessible via appropriate telecommunication networks, for example telephone and/or radiotelephone and/or data communication networks, including the Internet, from a user terminal TE which can be a telephone, a mobile radiotelephone, a microcomputer equipped with a modem, or a videotext terminal. The servers SV, SA, SIC and SFS can communicate with each other via dedicated links; in particular, the servers SV, SA and SIC are generally located on a site geographically remote from the site of the server SFS which is managed by the service provider, a phone company, and which offers access to the dedicated telephone answering and recording equipment for the selected telephone line.

Figure 2:
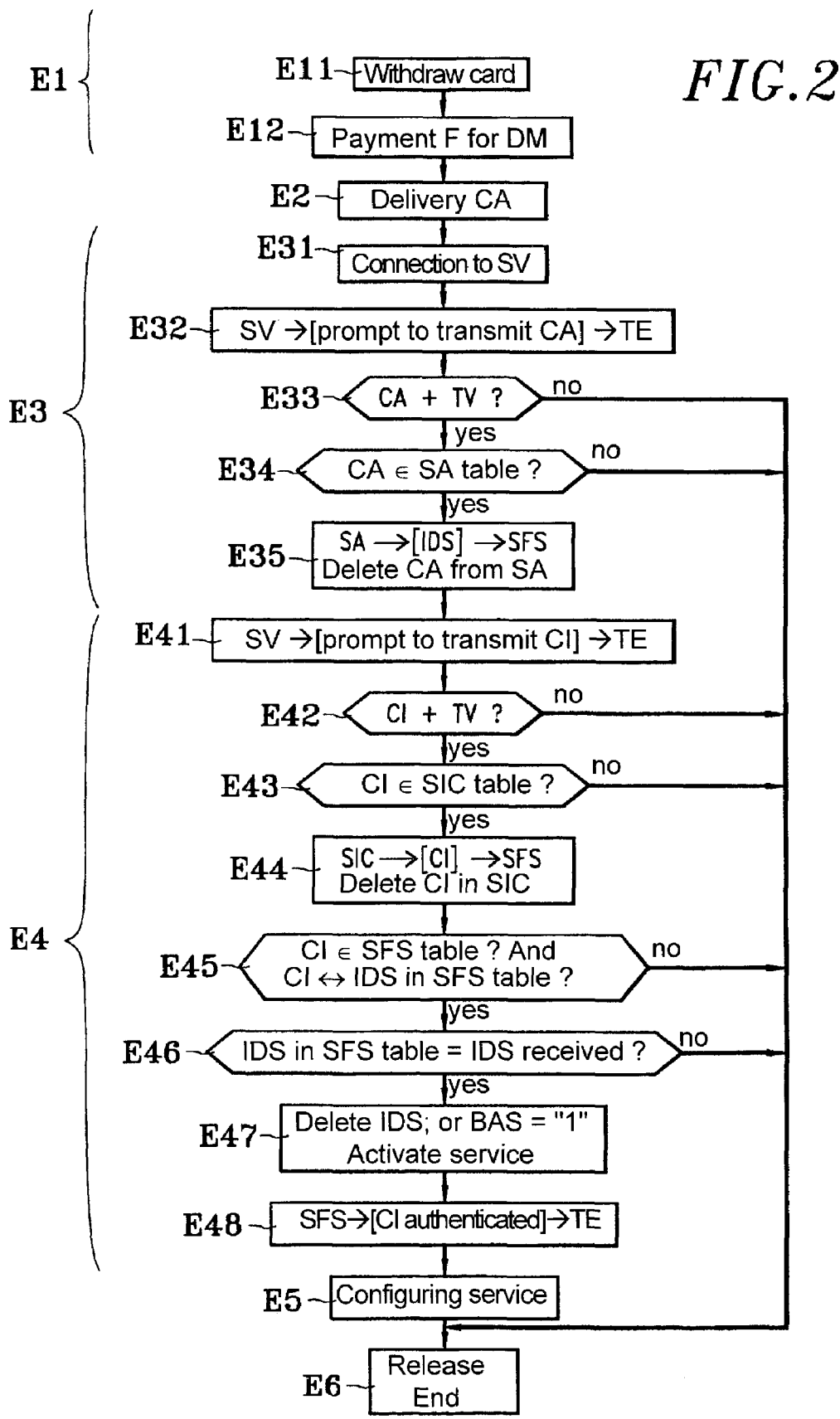
FIG. 2 is an algorithm of the service activation method.

As shown in FIG. 2, prior to a first use of the prepayment card CP, the service activation method according to the invention principally comprises a payment step E1, an activation code delivery step E2, an activation code authentication step E3, and an identification code authentication step E4, in order to activate the service in the server SFS after the two authentications, and where applicable after configuring the service in a step E5, before any use of the activated and configured service, the initiation of which is described subsequently with reference to FIG. 3. Steps E1, E3 and E4 comprise substeps E11 and E12, E31 to E35 and E41 to E48, respectively.

Initially, in step E1, the user-purchaser UA withdraws from the distributor-trader DC, such as a large retail outlet, a blister-packed prepaid card CP corresponding to the target telephone answering and recording equipment service or to a particular set of services, for example telephone services, including the target service (substep E11). The user UA then goes to a check-out of the distributor DC, possibly a special check-out for paying for prepaid cards, where he pays a fixed charge F for the service associated with the card CP for a maximum card validity duration DM that can be read on the card (substep E12). An area on the card CP is scratched off to reveal a first code called the identification code CI.

As already stated in connection with the prior art, the identification codes CI respectively associated with the prepaid cards CP offered for sale are prestored in a server, in this instance the service provision server SFS, but also, in accordance with the invention, in the identification and configuration server SIC. Each code CI is held in the memory of the server SIC only until it is authenticated in accordance with the invention in step E4, which subsequently prohibits all access to the target service in the server SFS, and is also held in memory in the server SFS throughout the period of validity of the associated card CP. The codes CI are alphanumeric codes with several characters, for example codes with 13 or 14 digits.

In exchange for the code CI read from the card CP that has been paid for, the check-out operator consults a file of codes in order to associate with the code CI, in a one-to-one mapping, a second code, referred to as the activation code CA, which is delivered to the user UA by the check-out operator, for example by writing it on the receipt for payment of the card, in step E2. In accordance with the invention, the activation code CA delivered in this way is used to authenticate the first code, i.e. the identification code CI of the card CP, to unlock access to the target service. Because he does not know the activation code CA, a person stealing the card CP is unable to access the target service even if he attempts to call the service provision server SFS and attempts to transmit the identification code CI revealed on the card after scratching off the covering.

The activation code CA is a string of alphanumeric characters, for example a number with 10 to 15 digits.

According to one feature of the invention, the activation code CA can comprise, in addition to a variable associated in a one-to-one mapping with the service to be activated, in this instance the target telephone answering and recording equipment, and/or a particular feature of the service to be activated, for example a validity limit of the card or a time band or a period of operation of the service to be activated, in this instance the telephone answering and recording equipment:

a value of the prepaid card, in this instance the fixed charge F, which can be 100 francs for a duration DM of three months, for example, or 300 francs for a duration DM of one year, and/or a prepaid card purchase receipt number, in particular to guard against possible "reloading" of access to the service in the server SFS;

an identifier of the type of service to be activated if the card CA can provide access to a service selected from a set of services, for example a set of telephone services; in this case, the user UA specifies the type of service to the check-out operator, who looks up the activation code CA in the file corresponding to the service;

an identifier of the provider of the service to be activated, and in particular the service provider managing the server SFS, which is a telephone carrier in this embodiment; and an identifier of issuer of the card, in this case the distributor-trader DC.

Using the terminal TE, the user-purchaser UA executes the authentication steps E3 and E4 in cooperation with the voice server SB.

At the beginning of the first authentication step E3, the user requests the setting up of an outgoing call from the terminal TE, seizing the corresponding telecommunication link, line and/or channel, and keying the calling number, which can be an Internet Protocol (IP) address, of the voice server SV which then connects to the activation server SA (substep E31). A message prompting transmitting of the activation code CA, for example "Key in your activation code and confirm by pressing your TV key" is transmitted from the voice server SV to the terminal TE.

It should be noted that the messages transmitted by the voice server SV, or subsequently by the server SFS, to dialog with the user at the terminal TE are voice messages that can be reproduced by a loudspeaker or buzzer of the terminal and/or text messages that can be displayed on a screen of the terminal. The TV key is a predetermined confirmation key, for example the # key on a telephone keypad or the ENTER key on a microcomputer keyboard.

Next the user keys in the activation code CA previously delivered by the check-out operator, and then presses the confirmation key TV to confirm the code (substep E32). In response to the code CA transmitted in digital form or in Dual-Tone Multifrequency (DTMF) code, for example, depending on the terminal type (substep E33), the server SA searches in an associated database, to be more precise in a table, for the code CA, in order to map it to an address ASFS of the service provision server SFS (substep E34), if there is a plurality of servers SFS, and a service identifier IDS.

If the code CA includes a plurality of identifiers, like those defined hereinabove, the server SA analyzes the code CA to look for the table in which the code CA might be found, for example by means of a tree structure; if the code CA contains a provider identifier and service type identifier, for example, the server SA searches first for the provider identifier in a provider table, then for the service in a table of types of service offered by the provider designated by the provider identifier, and finally for the variable always contained in the code CA in a table of variables designated by the service type identifier; the variables correspond to prepaid cards not yet used.

In substep E33, the server SA instructs the server SV to release the seized telecommunication link in the method end step E6 if the user has hung up, or has not keyed in the code CA, or has not pressed the confirmation key TV to confirm the code at the end of a predetermined time delay of a few seconds following on from substep E32, or from substep E34 if the server SA has not recognized the code CA keyed in, and in particular the variable therein.

After the activation code CA keyed in has been recognized by the activation server SA in substep E34, the server SA transmits to the server SFS an activation code authentication message containing a target service identifier IDS and deletes the code CA from the table (substep E35). The identifier IDS is stored in a queue of the server SFS, pending comparison (in a subsequent substep E46) during subsequent authentication of the identification code CI read on the card.

The service identifier IDS is preferably established using all or part of the authenticated activation code CA. For example, the identifier IDS includes the variable, the value of the card and the service type identifier. As an alternative to this, the identifier IDS is read in correspondence with the code CA recognized in the server SA. The server SFS is addressed using the address ASFS read in the table in which the code CA was found. For example, several servers SFS are allocated to different service providers, and each service provider manages several servers SFS, each offering one or more respective predetermined services; in the example shown, it is assumed that the server SFS offers a telephone answering and recording equipment service for a telephone carrier.

Deleting the code CA in the server in substep E35 prohibits subsequently any activation of service using the code CA, such as might be attempted by an ill-intentioned person.

At the end of the first authentication step E3, after the activation code CA keyed in has been recognized in a table of the server SA (substep E34), the service activation process continues with the second authentication step E4. The recognition of the code CA is signaled to the user UA by the voice server SV transmitting to the terminal TE, under the control of the server SA, a message prompting the user to transmit the identification code CI (substep E41). The server SV then releases the server SA and prepares a call to the identification and configuration server SIC.

In response to the above message, the user keys in the identification code CI read from the prepaid card CP after scratching off the covering, entered via the keypad of the terminal TE, and then presses the authentication key TV to confirm the code (substep E42). The code CI is transmitted via the server SV to the server SIC, in the same way as the code CA. The server SIC searches for the code CI keyed and transmitted in a table of identification codes for prepaid cards not yet used (substep E43). If the code CI is detected in the table, the address ASFS of the server SFS corresponding to the code CI is read in the table. The server SFS designated by the read address ASFS then receives from the server SIC a message containing the identification code CI. The server SIC then deletes the code CI (substep E44) to prohibit any subsequent identification in the server SIC of a card with the transmitted code CI.

In response to the authenticated identification code CI transmitted most recently, the server SFS searches for the code CI in a table that maps each code CI associated with a service offered by the server SFS and a respective service identifier IDS (substep E45). If the table includes an identifier IDS corresponding to the transmitted authenticated code CI, the server SFS searches (substep E46) the queue of identifiers IDS most recently transmitted by the server SA or by several similar servers SA and received by the server SFS for an identifier identical to the corresponding identifier IDS read in the table, in order to activate the service associated with the first code CI and the second code CA (substep E47).

Activating the service, in this instance the answering and recording equipment service, consists, for example, in marking the code CI, either by deleting the corresponding service identifier IDS in the table of the server SFS or by changing from "0" to "1" the state of a service activation bit BAS associated with the identification code CI in the table. Accordingly, the correspondence table in the server SFS contains pairs (CI, IDS) or triplets (CI, IDS, BAS="0") if the prepaid card CP with the code CI has not yet been used and pairs (CI, 0) or triplets (CI, IDS, BAS="1") if the card CP has already been used to activate the target service using the method in accordance with the invention described hereinabove.

Activation of the service following marking of the code CI is confirmed by the server SFS to the server SIC, which instructs the server SV to transmit an identification code authentication message to the terminal TE (substep E48), which, in the absence of configuration of the activated service, terminates the target service activation process in accordance with the invention, in step E6.

As in substeps E33 and E34, if in substep E42 the user has hung up, the code CI has not been keyed in, or the TV key has not been pressed after a predetermined time delay of a few seconds following on from transmitting of the message in substep E41, or if in substep E43 the server SIC has not recognized the code CI keyed in, or if in substep E45 the transmitted code CI has not been found in the server SFS, or if in substep E46 the identifiers IDS compared in the server SFS are different, then the server SV releases the link to the terminal TE under the control of the server SIC and, where applicable, the server SFS.

The server SFS programs the activated service in particular as a function of parameters carried by the identifier IDS. For example, if the identifier IDS carries the value of the card related to a maximum duration DM of use of the activated service, the duration DM is stored and a duration variable DU is set to 0 in a duration counter associated with the activated service in the server SFS.

After authentication of the identification code in step E4, the identification and configuration server SIC optionally initiates a dialog with the terminal TE of the user UA via the voice server SV to configure the service previously activated in the server SFS in substep E47.

This configuration of the activated service consists in collecting parameters and designations of particular functions from the terminal TE via the servers SV and SIC in order to program the activated service in the service provision server SFS before the service is really used. For the activated telephone answering and recording equipment, the server SFS collects from the user's terminal TE particularly the calling number of the fixed telephone subscriber line to which the answering and recording equipment is to be connected, the time band during which the answering and recording equipment is to be connected to the line, and the calling number of the line or channel of the telephone terminal, including a mobile radiotelephone, to which a short message is to be sent by the server SFS in response to a message being deposited in the answering and recording equipment.

After step E4, or optionally after step E5, the process terminates with the release of the link between the terminal TE and the server SV in step E6.

Subsequently, if the user UA wishes to access the service, he carries out the activated service use steps U1 to U8 shown in FIG. 3, relating to communications between the terminal TE and the service provision server SFS.

The user UA calls the server SFS from the terminal TE or any other terminal by keying in its calling number (step U1). Then, after a voice and/or text message prompting transmitting of the code CI has been transmitted from the server SFS to the terminal (step U2), the user keys in the identification code CI read on the prepaid card CP and presses the TV key to confirm the code (step U3).

The server SFS searches the identification code table for the code CI keyed in at and sent by the terminal TE (step U4). If the code CI keyed in is recognized in the table, the server SFS verifies that the service associated with the recognized code CI is activated by noting that the associated identifier IDS has been deleted or that the service activation indicator BAS is in the activated state "1" (step U5). As a general rule, the activated service having a limited duration, the server then verifies that the maximum duration DM has not expired by comparing the current duration DU to the maximum duration DM (step U6). If DU<DM, the server authorizes access to the activated service (step U7); in this instance, the user interrogates the server SFS to listen to the latest messages stored in the answering and recording equipment, delete some of them, or to modify the parameters of the answering and recording equipment, for example the operating time band.

As in steps E33 and E42, if the user has hung up, or no code CI has been keyed in, or the TV key has not been pressed in step U3, the server SFS releases the link with the terminal in step U8.

Similarly, if the server SFS fails to find the identification code CI transmitted by the terminal in its table in step U4, or if an identifier IDS or an indicator BAS in the deactivated state "0" is associated with the code CI transmitted and recognized in step U5, the method moves on to the final step U8.

In step U6, if the maximum duration DM of use is reached, the server SFS deletes the identification code CI in the table in step E61 to prohibit any subsequent use of the service by means of the code CI, and then clears down the link with the terminal TE in step E8. The carrier updates the table by periodically assigning new codes CI and new indicators IDS associated with new codes CA to answering and recording equipments that are no longer used, in correspondence with cards to be put on sale.

In another application, the target service consists in consuming telephone call units prepaid by purchasing a prepaid card CP having a predetermined consumption credit F. For this application, the service provision server SFS associates with each pair of codes (CI, CA) or (CI, IDS) a telephone unit counter that initially contains the credit F and from which telephone units are decremented as set-up outgoing telephone calls using the code CI run. Steps E1 to E6 for activating the counter are executed as described with reference to FIG. 2, eliminating the configuration step E5, which is of no utility in this second embodiment.

In a further application, the target service consists in purchasing virtual products offered on the screen of the user's terminal TE by a server SFS managed by a product retailer. This application is similar to the preceding second application; instead of consuming telephone units, the user consumes monetary units until the credit F associated with the prepaid card CP is used up.

In another variant, the so-called authentication substeps E32 to E35 for authenticating the activation code CA in the server SA can follow on from the authentication substeps E41 to E44 for authenticating the identification code CI in the server SIC. However, this variant has the drawback that the identification server SIC can dialog with a thief who has stolen a prepaid card, which busies the server SIC unnecessarily, until the server SA finds out in the normal course of events that the code CA sent by the thief is not in the list stored in the server SA.

In a simpler variant of the embodiment illustrated in FIG. 2, the service provision server SFS contains only a list of identification codes CI, with no corresponding list of identifier IDS or activation code CA, and the target service is deemed to be activated as soon as the server SFS recognizes the code CI transmitted by the server SIC in substep E44. For this variant, the check-out operator delivers the activation code CA independently of the code CI read on the card; also, there is no identifier IDS, and so no such code is sent in substep E35 or searched for, read and deleted in substeps E45, E46 and E47.

The virtual prepaid card CP, rather than being a "non-material" card and reduced to the identification code CI to be uncovered by scratching, can be a "material" card and contain an integrated circuit containing a memory in which the identification code CI is prestored or computed cryptographically on each use, and in which the activation code CA is stored when paying the check-out operator for the card in step E2. In this case, the check-out operator has a terminal having a card reader/writer, like the user terminal TE, to dialog with the card and write the activation code CA to it, and the codes CA and CI are sent from the card CP via the terminal TE in substeps E33 and E42.

The invention is not limited to the functional architecture shown by way of example in FIG. 1. For example, the servers SV, SA and SIC can be combined into a single server, or the servers SIC and SFS can be combined into a single server, or the server SFS can be divided into a plurality of servers or groups of servers respectively associated with different services, or distributed in a server managing parameters such as cost and duration related to the service and a server providing the actual service to be activated.

What is claimed is:

1. A method of activating a service using a prepaid card in a service provision arrangement from a user terminal arrangement, a first code necessary to use the service being associated with the card and stored in the service provision arrangement prior to payment for the card, which method comprises the steps of:

delivering a second code associated with said card on paying for said card, transmitting one of said first code and second code from said terminal arrangement to one authentication arrangement, authenticating said one code in said one authentication arrangement, transmitting the other of said first code and second code from said terminal arrangement to another authentication arrangement, detecting said one code in said one authentication arrangement and authenticating said other code in said another authentication arrangement when said one code has been authenticated, and deleting said other code in said another authentication arrangement and activating said service in said service provision arrangement at least in response to the authenticated first code after said other code has been authenticated.

2. A method according to claim 1, wherein the second code comprises at least one of the following parameters: a validity limit of said prepaid card, a time band and a time period of operation of said service to be activated, a value of said prepaid card, a prepaid card receipt number, an identifier of the type of said service to be activated, an identifier of the provider of said service to be activated, and an identifier of the issuer of said prepaid card.

3. A method according to claim 1, wherein said one of said first code and second code is said second code whereby the second code authenticating step precedes the first code authenticating step, which is executed only if said second code has been authenticated.

4. A method according to claim 1, wherein said one of said first code and second code and said other of said first code and second code are respectively said first code and second code, and the step of authenticating said first and the step of authenticating said second code are respectively executed in a first server and a second server communicating with said terminal arrangement via a server of at least voice message.

5. A method according to claim 4, wherein said second server transmits a service identifier, which is at least a portion of said second code, to said service provision arrangement, and said service is activated if the authenticated first code transmitted by said first server to said service provision arrangement is found in correspondence with said service identifier in a prestored table of said service provision arrangement.

6. A method according to claim 5, wherein said service provision arrangement is designated by an address in correspondence with said first code and said second code authenticated in said first server and said second server in order to transmit said authenticated first code and said service identifier from said first server and second server to said service provision arrangement.

7. A method according to claim 1, wherein said service is deemed to be activated when said service provision arrangement deletes a service identifier, which is at least a portion part of the authenticated second code, in a prestored table of the service provision arrangement, after the authenticated first code is found in correspondence with said service identifier.

8. A method according to claim 7, wherein, when said card is used, said service provision arrangement authorizes access to said activated service only in response to said first code transmitted by said terminal arrangement and to a verification of the absence of a service identifier in correspondence with said first code in said prestored table.

9. A method according to claim 1, including a step of configuring said service which has been activated, by collecting parameters and designations of functions from said terminal arrangement for programming said service in said service provision arrangement.

10. A method according to claim 9, wherein, when said card is used, said service provision arrangement authorizes access to said activated service only in response to said first code transmitted by said terminal arrangement and to a verification another predetermined state of the service activation indicator in correspondence with said first code in said prestored table.

11. A method according to claim 1, wherein the prepaid card is a non-material virtual prepaid card in which said first code is readable.

12. A method according to claim 1, wherein said service includes dedicating an answering and recording equipment to a fixed telephone line selected after activating said service.

13. A method according to claim 1, wherein said service is deemed to be activated when said service provision arrangement changes the state of a service activation indicator in a prestored table of said service provision arrangement, after the authenticated first code is found in correspondence with said service activation indicator in a predetermined state.

14. A method according to claim 1, wherein said prepaid card is a material virtual prepaid card in which said first code is prestored and said second code is stored on paying for said card.

15. A method of activating a service using a prepaid card in a service provision arrangement from a user terminal arrangement, a first code necessary to use the service being associated with the card and stored in the service provision arrangement prior to payment for the card, which method comprises the steps of:

delivering a second code associated with said card on paying for said card, authenticating arrangement one of said first code and second code, authenticating the other of said first code and second code when said one code has been authenticated, and activating said service in said service provision arrangement at least in response to the authenticated first code after said other code has been authenticated, said service being deemed to be activated when said service provision arrangement deletes a service identifier, which is at least a portion part of the authenticated second code, in a prestored table of the service provision arrangement, after the authenticated first code is found in correspondence with said service identifier.

16. A method of activating a service using a prepaid card in a service provision arrangement from a user terminal arrangement, a first code necessary to use the service being associated with the card and stored in the service provision arrangement prior to payment for the card, which method comprises the step of:

delivering a second code associated with said card on payment for said card, authenticating arrangement one of said first code and second code, authenticating the other of said first code and second code when said one code has been authenticated, and activating said service in said service provision arrangement at least in response to the authenticated first code after said other code has been authenticated, deleting said other code in said authentication arrangement said service being deemed to be activated when said service provision arrangement changes the state of a service activation indicator in a prestored table of service provision arrangement, after the authenticated first code is found in correspondence with said service activation indicator in a predetermined state.

* * * * *